(12) United States Patent
Kennedy et al.

(10) Patent No.: US 11,507,526 B1
(45) Date of Patent: Nov. 22, 2022

(54) SYSTEM AND METHOD OF ARBITRATING SERIAL BUSES OF INFORMATION HANDLING SYSTEMS

(71) Applicant: Dell Products L.P., Round Rock, TX (US)

(72) Inventors: Brian Daniel Kennedy, Rutland, MA (US); Nicholas Anthony Esposito, The Woodlands, TX (US); Maxwell Brooks Rapier, Duxbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/354,298

(22) Filed: Jun. 22, 2021

(51) Int. Cl.
*G06F 13/374* (2006.01)
*G06F 15/78* (2006.01)
*G06F 13/40* (2006.01)
*G06F 13/42* (2006.01)

(52) U.S. Cl.
CPC ........ *G06F 13/374* (2013.01); *G06F 13/4059* (2013.01); *G06F 13/4282* (2013.01); *G06F 15/7807* (2013.01)

(58) Field of Classification Search
CPC .............. G06F 13/374; G06F 13/4059; G06F 13/4282; G06F 15/7807
See application file for complete search history.

(56) References Cited

U.S. PATENT DOCUMENTS

| 2013/0067134 A1* | 3/2013 | Austen | G06F 13/4291 710/305 |
| 2016/0239371 A1* | 8/2016 | Jose | G06F 11/0745 |
| 2019/0108143 A1* | 4/2019 | Smith | G06F 13/1673 |
| 2021/0216490 A1* | 7/2021 | Kumar | G06F 13/4282 |

OTHER PUBLICATIONS

UM10204 I²C-bus Specification and User Manual, Rev. 6—Apr. 4, 2014, NXP Semiconductors; 64 pages.
AN10216-01 I²C Manual—Application Note, Mar. 24, 2003; 51 pages.

\* cited by examiner

*Primary Examiner* — Phong H Dang
(74) *Attorney, Agent, or Firm* — McDermott Will & Emery LLP

(57) ABSTRACT

In one or more embodiments, one or more systems, one or more methods, and/or one or more processes may receive first data from a first device via a first two-wire interface (TWI) bus; provide the first data to a second device via a second TWI bus; receive a first arbitration request via an out of band arbitration process from a third device; provide first control information via an in band arbitration process to the first device via the first TWI bus; receive second data from an isolation device via a third TWI bus; provide the second data to the second device via the second TWI bus; receive a second arbitration request via the in band arbitration process from the first device via the first TWI bus; and provide second control information via the out of band arbitration process to the third device.

20 Claims, 10 Drawing Sheets

11,507,526 B1

SYSTEM AND METHOD OF ARBITRATING SERIAL BUSES OF INFORMATION HANDLING SYSTEMS

BACKGROUND

Field of the Disclosure

This disclosure relates generally to information handling systems and more particularly to arbitrating serial buses of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive first data from a first device via a first two-wire interface (TWI) bus of multiple TWI buses; may provide the first data to a second device via a second TWI bus of the multiple TWI buses; may receive a first arbitration request via an out of band arbitration process from a third device via an out of band signal path external to a third TWI bus of the multiple TWI buses and a TWI bus that couples to the third device to an isolation device; in response to receiving the first arbitration request, may provide first control information via the in band arbitration process to the first device via the first TWI bus; after providing the first control information, may receive second data from the isolation device via the third TWI bus, in which the isolation device received the second data from the third device; may provide the second data to the second device via the second TWI bus; may receive a second arbitration request via the in band arbitration process from the first device via the first TWI bus; and in response to receiving the second arbitration request, may provide second control information via the out of band arbitration process to the third device via the out of band signal path. In one or more embodiments, the TWI arbitrator may be indirectly coupled to the baseboard management controller via the isolation device. In one or more embodiments, a TWI arbitrator may include multiple arbitration controllers. In one example, providing the first control information via the in band arbitration process to the first device may include providing, by a first arbitration controller of the multiple arbitration controllers, the first control information via the in band arbitration process to the first device via the first TWI bus. In another example, providing the second control information via the out of band arbitration process to the third device via the out of band signal path may include providing, by a second arbitration controller of the multiple arbitration controllers, the second control information via the out of band arbitration process to the third device via the out of band signal path.

In one or more embodiments, the first TWI bus may include an inter-integrated circuit ($I^2C$) bus. For example, the first arbitration controller includes a pseudo $I^2C$ initiator configured to utilize an $I^2C$ bus arbitration process. For instance, providing, by the first arbitration controller, the first control information via the in band arbitration process to the first device via the first TWI bus may include providing, by the pseudo $I^2C$ initiator, the first control information via the in band arbitration process to the first device via the $I^2C$ bus. In one or more embodiments, the TWI arbitrator may include a channel switch. For example, after providing the first control information, the TWI arbitrator may configure the channel switch from a first channel associated with the first TWI bus to a second channel associated with the third TWI bus to receive the third data from the isolation device via the third TWI bus.

In one or more embodiments, the TWI arbitrator may include a buffer. For example, the TWI arbitrator may, after receiving the first data from the first device, store at least a portion of the first data in the buffer. For instance, providing the first data to the component may include the TWI arbitrator retrieving the at least the portion of the first data from the buffer. In one or more embodiments, retrieving the at least the portion of the first data from the buffer and providing the first control information to the SoC may be performed concurrently.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
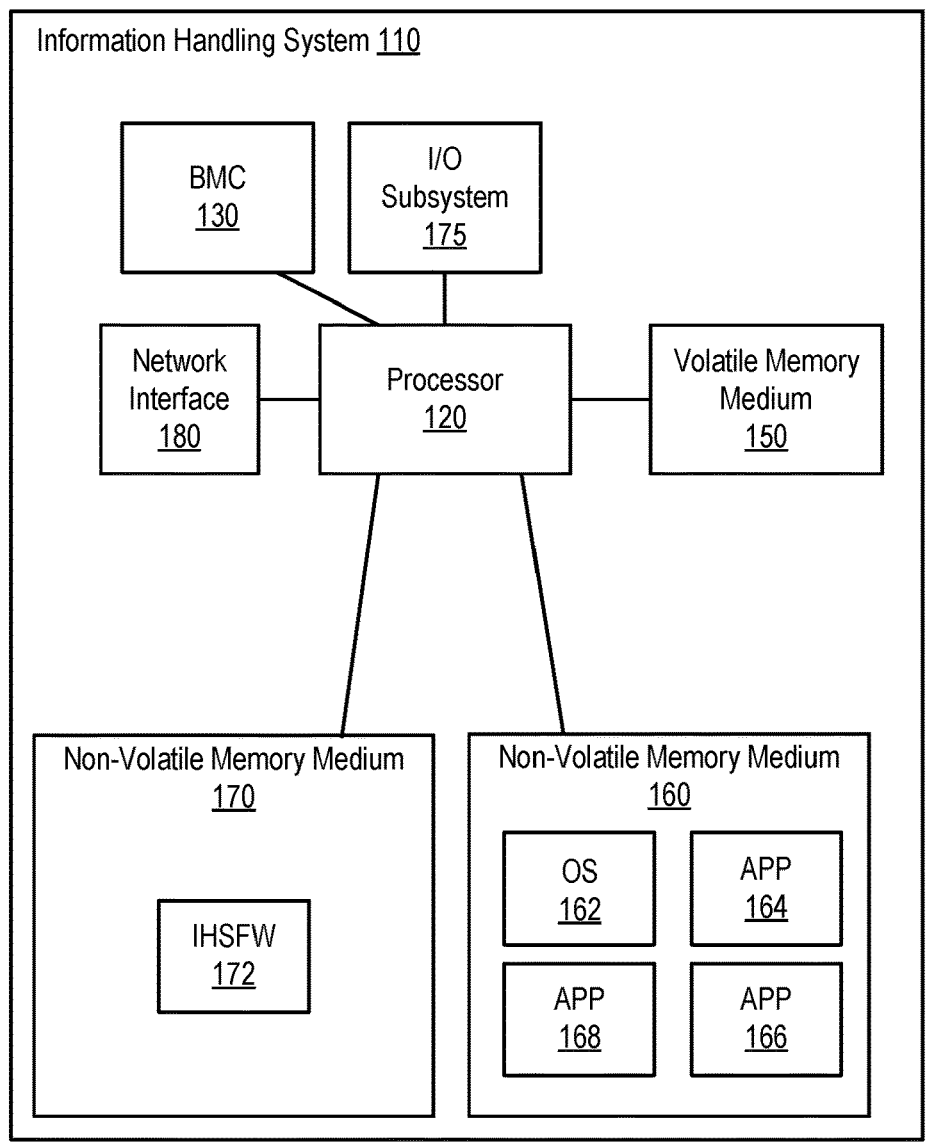
FIGS. 1A and 1B illustrate an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a two-wire interface (TWI) may be utilized in communications between or among two or more integrated circuit components. For example, the two or more components may include two or more of one or more microcontrollers, one or more sensors, one or more storage devices, one or more processors, and/or other devices enclosed within a housing. For instance, the housing may be a housing and/or a chassis of an information handling system. In one or more embodiments, the TWI may be based at least on an inter-integrated circuit ($I^2C$) specification, developed by Philips Semiconductors. For example, the TWI may be compliant with the $I^2C$ specification.

In one or more embodiments, a device that utilizes the TWI may be an initiator or a target. For example, multiple devices may be coupled to a TWI bus. For instance, a single device coupled to the TWI bus may be an initiator, and any other device coupled to the TWI bus may be a target. In one or more embodiments, multiple devices that may be coupled to a TWI bus may switch roles. For example, a first device coupled to the TWI bus may be an initiator for a first amount of time, while a second device coupled to the TWI bus may be a target, and the second device may be an initiator for a second amount of time, while the first device may be a target. In one or more embodiments, an initiator device may be a master device. In one or more embodiments, a target device may be a slave device.

In one or more embodiments, a TWI bus may support more than one initiator. For example, multi-initiator arbitration may be utilized. For instance, multi-initiator arbitration may include an $I^2C$ defined in-band method of arbitration standard. In one or more embodiments, multi-initiator arbitration may be utilized for use cases where a design is not complex or where high-availability is not sought. In one example, multiple initiators may not be designed for placement behind isolation circuitry and/or one or more bus switches, which may be useful for hot plug and one or more reductions of bus loading. In another example, multiple initiators may become stuck in a "hung state". These examples may illustrate a lack of robustness of utilizing multi-initiator arbitration, according to one or more embodiments.

In one or more embodiments, a device may interpose one or more TWI target devices and two or more TWI initiator devices. For example, the device that may interpose the one or more TWI target devices and the two or more TWI initiator devices may act as an arbiter between or among the two or more TWI initiator devices. In one or more embodiments, the TWI initiator devices may utilize a standard TWI multi-initiator protocol or an alternate TWI arbitration process. For example, the device may support multiple arbitration methods. For instance, there may never be more than one initiator on a TWI bus at one time. In one or more embodiments, the device that may interpose the one or more TWI target devices and the two or more TWI initiator devices may allow utilization of third-party TWI initiators with no custom firmware and/or no additional firmware required. In one or more embodiments, the device that may interpose the one or more TWI target devices and the two or more TWI initiator devices may allow utilization of multiple TWI buses with different multi-initiator arbitration schemes to be coupled to a single TWI target device.

Figure 1B:
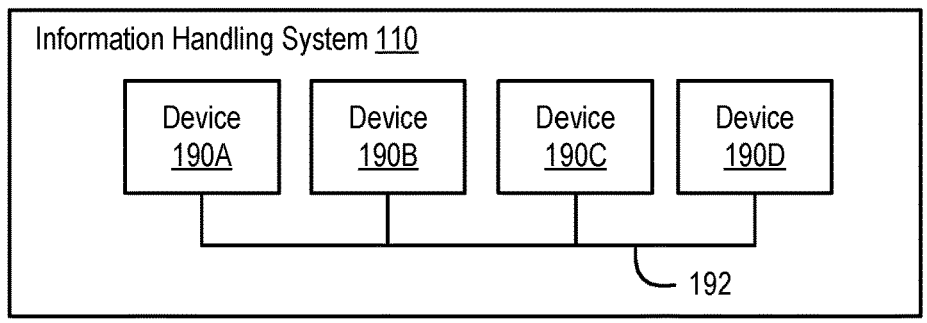

Turning now to FIGS. 1A and 1B, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O BMC 130, subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, a PCIe interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more buses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated in FIG. 1B, IHS 110 may include multiple devices 190A-190D, which may be coupled to a TWI bus 192. For example, a device 190 may be or include a component of IHS 110. For instance, a component of IHS 110 may include a SoC, processor 120, BMC 130, volatile memory medium 150, non-volatile memory media 160 and 170, PO subsystem 175, or network interface 180, among others.

Figure 2A:
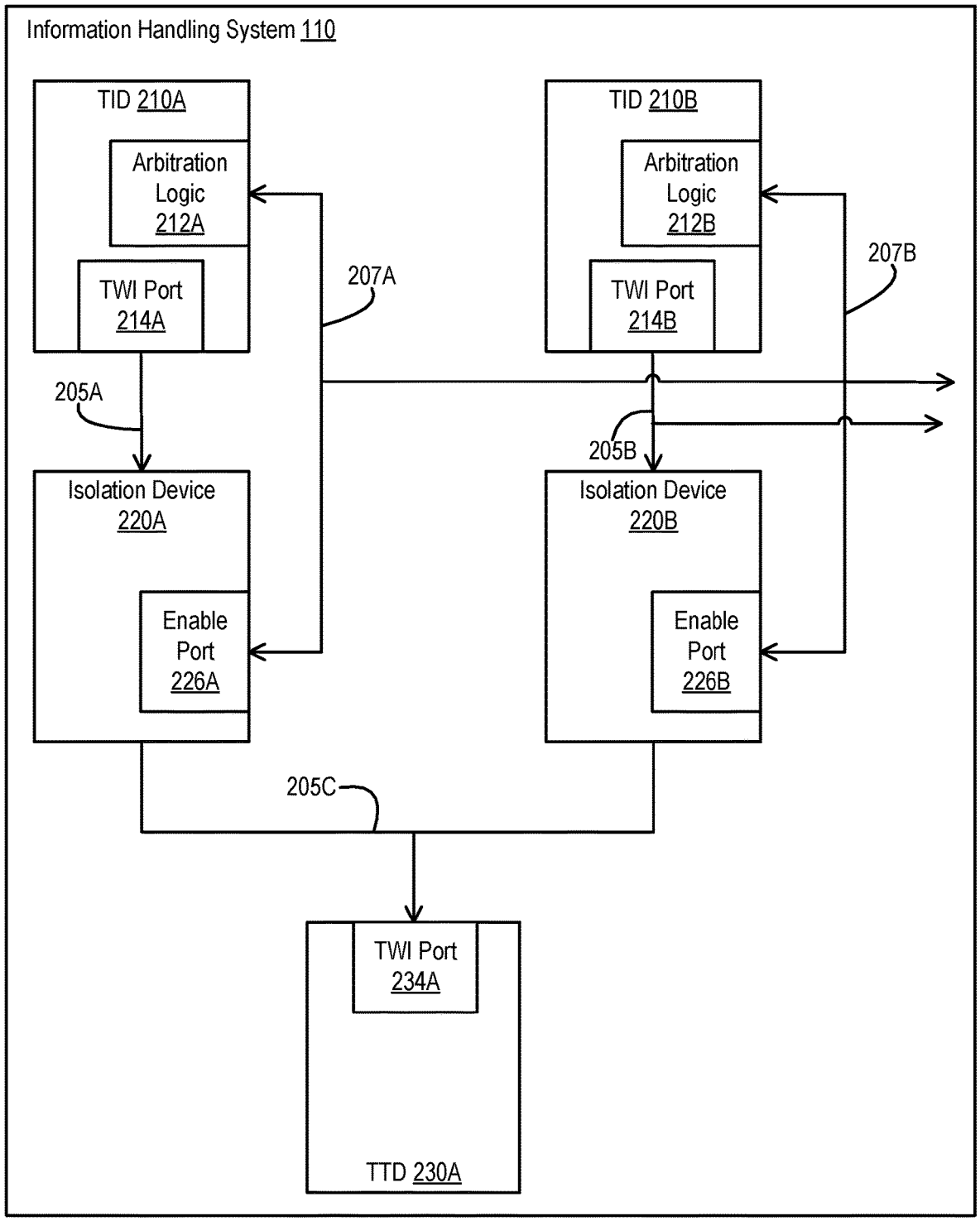
FIG. 2A illustrates an example of multiple two-wire interface initiator devices that utilize out of band signal paths, according to one or more embodiments.

Turning now to FIG. 2A, an example of multiple two-wire interface initiator devices that utilize out of band signal paths is illustrated, according to one or more embodiments.

In one or more embodiments, IHS 110 may include TWI initiator devices (TIDs) 210A and 210B. For example, TIDs 210A and 210B may be communicatively coupled to TWI buses 205A and 205B, respectively. For instance, TIDs 210A and 210B may respectively include TWI ports 214A and 214B, which may be respectively coupled to TWI buses 205A and 205B.

In one or more embodiments, TIDs 210A and 210B may respectively include arbitration logic 212A and arbitration logic 212B. For example, arbitration logic 212A and arbitration logic 212B may be respectively coupled to out of band (e.g., side band) signal paths 207A and 207B. For instance, an out of band (e.g., side band) signal path 207 may be external to a TWI bus 205. As one example, an out of band signal path 207 may be utilized to communicate an arbitration request. As another example, an out of band signal path 207 may be utilized to communicate control information.

In one or more embodiments, IHS 110 may include isolation devices 220A and 220B. For example, isolation devices 220A and 220B may respectively include enable ports 226A and 226B, which may be respectively coupled to out of band signal paths 207A and 207B. In one or more embodiments, an isolation device 220 may include a bus switch. In one or more embodiments, an enable port 226 may receive an arbitration request from an arbitration logic 212. For example, when a TWI initiator device (TID) 210 aims to be a TWI bus initiator, TID 210 may provide an arbitration request to become the TWI bus initiator via enable port 226 to an out of band signal path 207. In one or more embodiments, isolation devices 220A and 220B may be coupled to a TWI bus 205C. For example, a TWI target device (TTD) 230A may be coupled to TWI bus 205C. For instance, TTD 230A may include a TWI port 234, which may be coupled to TWI bus 205C. As an example, TTD 230A may utilize TWI port 234 to communicate with TWI bus 205C and/or with isolation devices 220A and 220B via TWI bus 205C.

In one or more embodiments, a TWI bus 205 may include a first line for a clock signal and a second line for a data signal. In one example, a device coupled to TWI bus 205 may provide a data signal in accordance with a clock signal. In another example, a device coupled to TWI bus 205 may receive a data signal in accordance with a clock signal. In one or more embodiments, multiple clock signals of respective multiple TWI buses 205 may share a frequency. In one example, the multiple clock signals of respective multiple TWI buses 205 may be synchronized. In another example, at least a first clock signal of the multiple clock signals of respective multiple TWI buses 205 may not be synchronized with at least a second clock signal of the multiple clock signals of respective multiple TWI buses 205. In one or more embodiments, at least a first clock signal of the multiple clock signals of respective multiple TWI buses 205 may not share a frequency with at least a second clock signal of the multiple clock signals of respective multiple TWI buses 205.

Figure 2B:
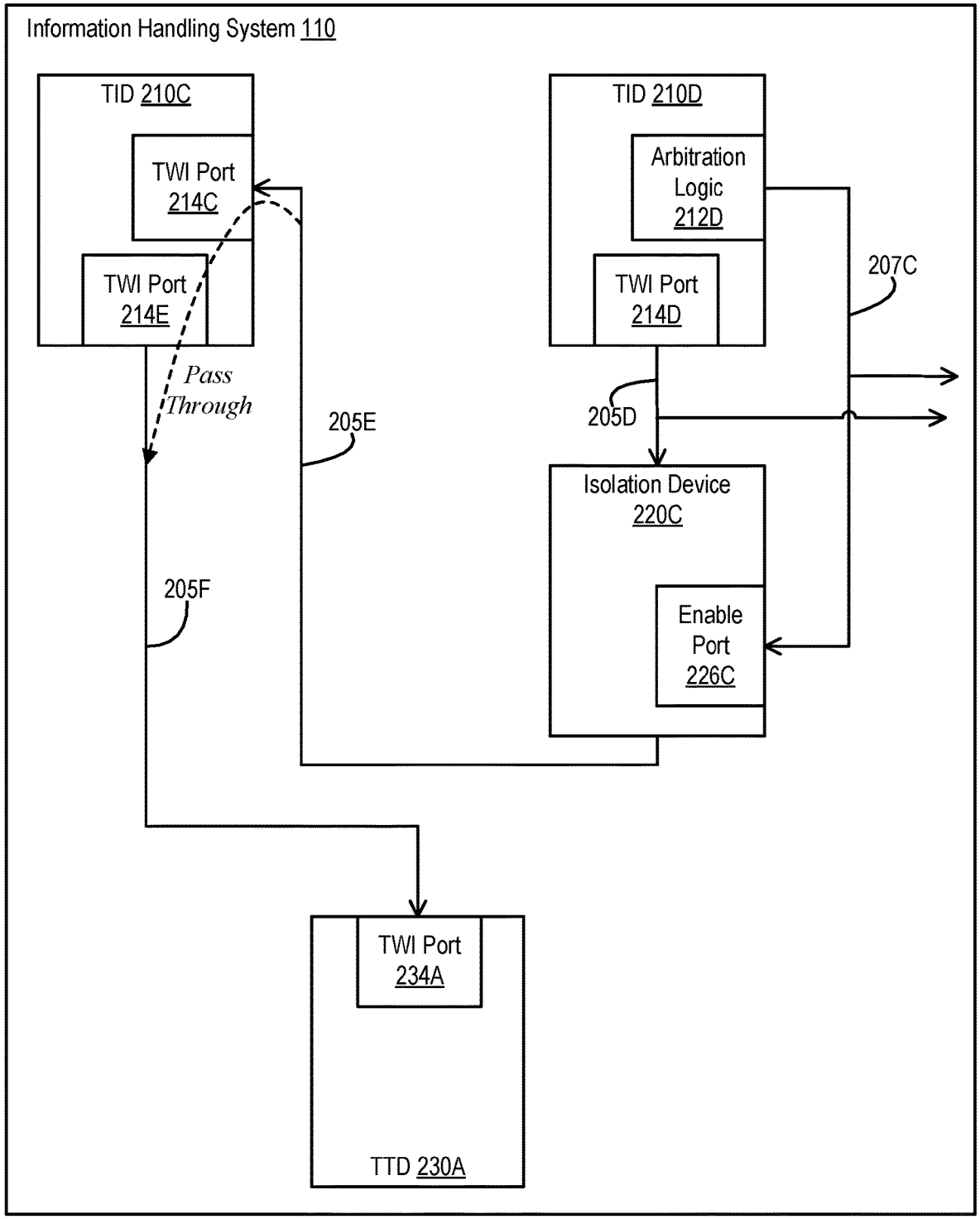
FIG. 2B illustrates an example of multiple two-wire interface initiator devices that utilize a pass-through process, according to one or more embodiments.

Turning now to FIG. 2B, an example of multiple two-wire interface initiator devices that utilize a pass-through process is illustrated, according to one or more embodiments. In one or more embodiments, IHS 110 may include TIDs 210C and 210D. In one example, TID 210D may be coupled to a TWI bus 205D. For instance, TID 210D may include a TWI port 214D, which may be coupled to TWI bus 205D. In another example, TID 210C may be coupled to TWI buses 205E and 205F. For instance, TID 210C may include TWI ports 214C and 214E, which may be respectively coupled to TWI buses 205E and 205F.

In one or more embodiments, TID 210D may include an arbitration logic 212D, which may be coupled to an out of band signal path 207C. For example, out of band signal path 207C may be external to TWI buses 205D-205F. As one example, out of band signal path 207C may be utilized to communicate an arbitration request. As another example, out of band signal path 207C may be utilized to communicate control information.

In one or more embodiments, TTD 230A may be coupled to TWI bus 205F. For example, TWI port 234A may be coupled to TWI bus 205F. In one or more embodiments, an isolation device 220C may be coupled to TWI bus 205D. For example, isolation device 220C may provide data to TID 210C via TWI bus 205E. For instance, TID 210C may pass the data from TWI bus 205E through to TWI bus 205F. As an example, TID 210D may not have direct access to TTD 230A when pass through is utilized. For instance, TID 210D may not have direct access to TTD 230A when TID 210C passes the data from TWI bus 205E through to TWI bus 205F. In one or more embodiments, TID 210C may include pass through firmware. For example, instructions of the pass through firmware may enable and/or configure TID 210C to pass the data from TWI bus 205E through to TWI bus 205F.

Figure 2C:
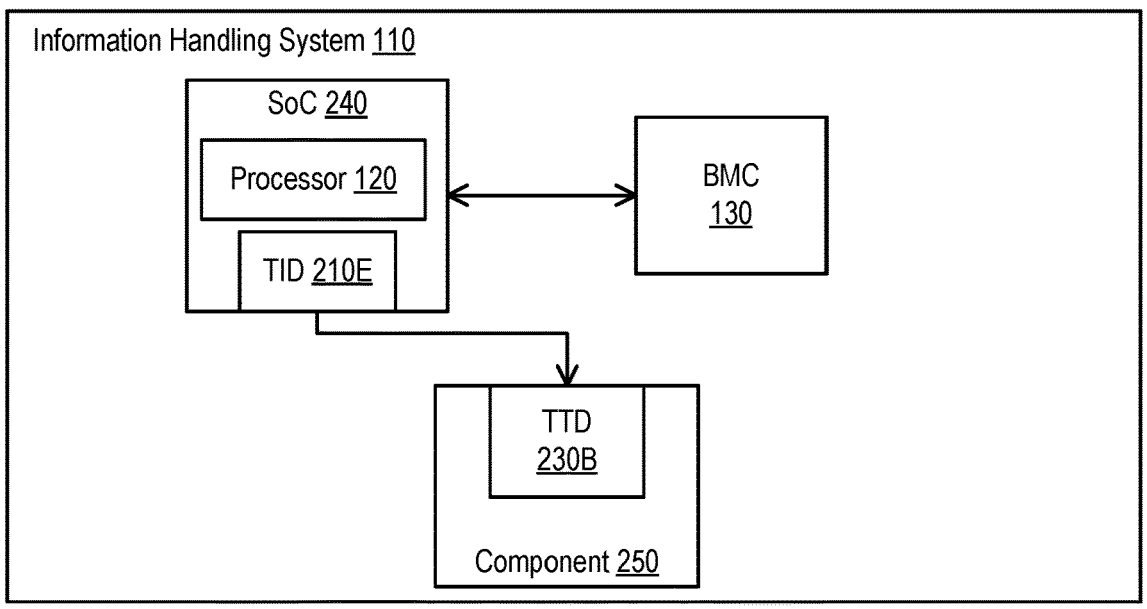
FIG. 2C illustrates an example of multiple components of an information handling system utilizing two-wire interfaces, according to one or more embodiments.

Turning now to FIG. 2C, an example of multiple components of an information handling system utilizing two-wire interfaces is illustrated, according to one or more embodiments. In one or more embodiments, BMC 130 may be coupled to a SoC 240 via a first TWI bus. As illustrated, SoC 240 may include processor 120 and a TID 210E. For example, TID 210E may be coupled to a second TWI bus. In one or more embodiments, SoC 240 may be coupled to a component 250 via the second TWI bus. As shown, component 250 may include a TTD 230B, which may be coupled to the second TWI bus. In one or more embodiments, component 250 may include volatile memory medium 150, non-volatile memory media 160 and 170, PO subsystem 175, network interface 180, or a high speed external connector, among others.

Figure 2D:
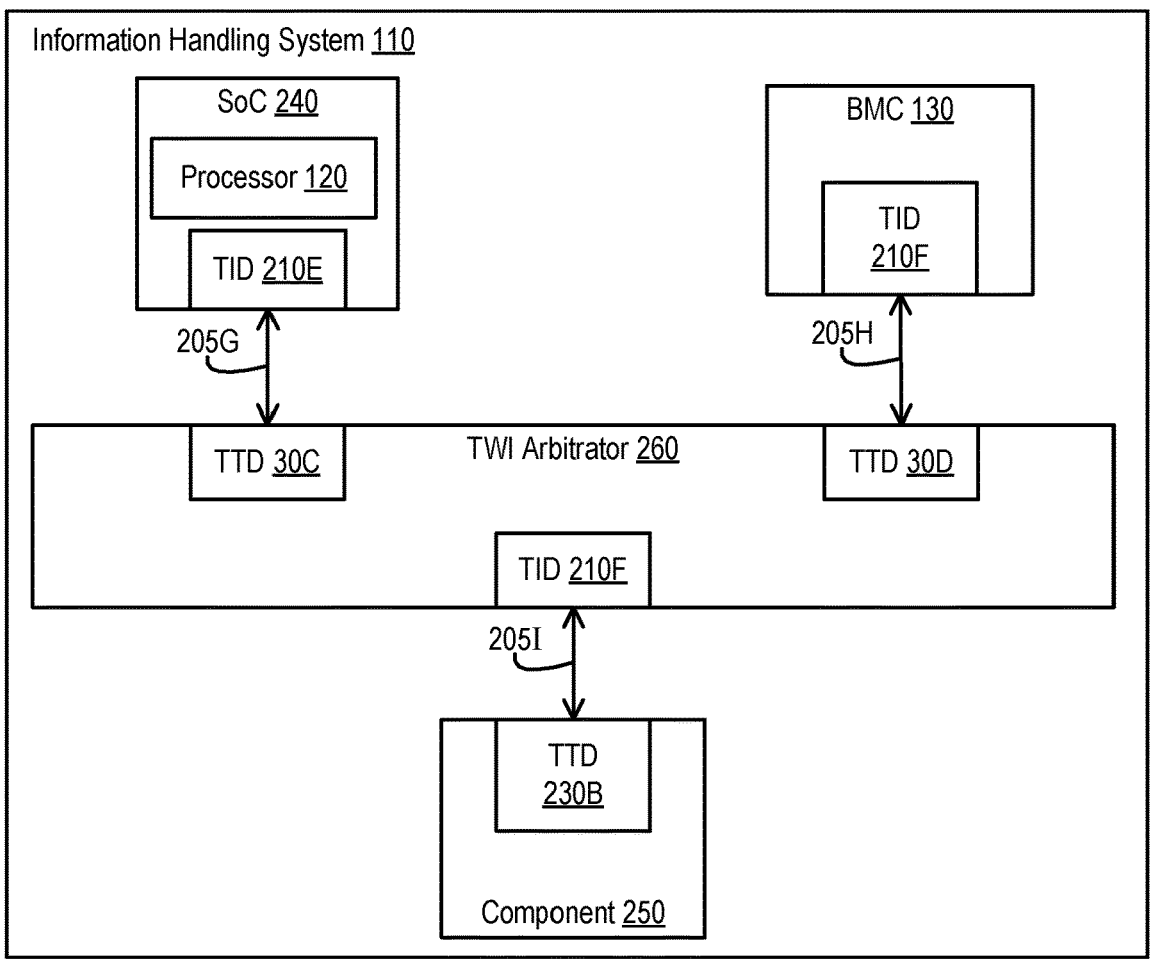
FIG. 2D illustrates an example of a multiple components of an information handling system coupled to a two-wire interface arbitrator, according to one or more embodiments.

Turning now to FIG. 2D, an example of a multiple components of an information handling system coupled to a two-wire interface arbitrator is illustrated, according to one or more embodiments. In one or more embodiments, SoC 240 may be coupled to a TWI bus 205G. For example, TWI bus 205G may be coupled to a TWI arbitrator 260. In one or more embodiments, SoC 240 may include TID 210E, which may be coupled to TWI bus 205G. In one or more embodiments, TWI arbitrator 260 may include a TTD 230C, which may be coupled to TWI bus 205G.

In one or more embodiments, BMC 130 may be coupled to a TWI bus 205H. For example, TWI bus 205H may be coupled to TWI arbitrator 260. In one or more embodiments, BMC 130 may include a TID 210F, which may be coupled to TWI bus 205H. In one or more embodiments, TWI arbitrator 260 may include a TTD 230D, which may be coupled to TWI bus 205H. In one or more embodiments, TWI arbitrator 260 may be coupled to a TWI bus 205I. For example, TWI arbitrator 260 may include a TID 210F, which may be coupled to TWI bus 205I. In one or more embodiments, component 250 may be coupled to TWI bus 205I. For example, TTD 230B of component 250 may be coupled to TWI bus 205I.

In one or more embodiments, TWI arbitrator 260 may determine which of SoC 240 and BMC 130 can communicate with component 250. In one example, TWI arbitrator 260 may determine that SoC 240 can communicate with component 250. In one instance, TWI arbitrator 260 may permit SoC 240 to transfer data to and/or from component 250. In another instance, when TWI arbitrator 260 permits SoC 240 to transfer data to and/or from component 250, TWI arbitrator 260 may stall or interrupted BMC 130 from being able to communicate with component 250. In another example, TWI arbitrator 260 may determine that BMC 130 can communicate with component 250. In one instance, TWI arbitrator 260 may permit BMC 130 to transfer data to and/or from component 250. In another instance, when TWI arbitrator 260 permits BMC 130 to transfer data to and/or from component 250, TWI arbitrator 260 may stall or interrupted SoC 240 from being able to communicate with component 250. In one or more embodiments, TWI arbitrator 260 may determine which of SoC 240 and BMC 130 can be a TWI initiator device. In one example, TWI arbitrator 260 may determine that SoC 240 can be the TWI initiator device. In one instance, TWI arbitrator 260 may permit SoC 240 to transfer data to component 250 as the TWI initiator device. In another instance, when TWI arbitrator 260 permits SoC 240 to transfer data to component 250 as the TWI initiator device, TWI arbitrator 260 may stall or interrupted BMC 130 from being the TWI initiator device. In another example, TWI arbitrator 260 may determine that BMC 130 can be the TWI initiator device. In one instance, TWI arbitrator 260 may permit BMC 130 to transfer data to component 250 as the TWI initiator device. In another instance, when TWI arbitrator 260 permits BMC 130 to transfer data to component 250 as the TWI initiator device, TWI arbitrator 260 may stall or interrupted SoC 240 from being the TWI initiator device.

In one or more embodiments, TWI arbitrator 260 may permit utilization of third-party TWI initiators with no custom firmware required and/or no additional firmware required. In one or more embodiments, TWI arbitrator 260 may permit utilization of multiple TWI buses with different multi-initiator arbitration schemes to be coupled to TTD 230B.

Figure 2E:
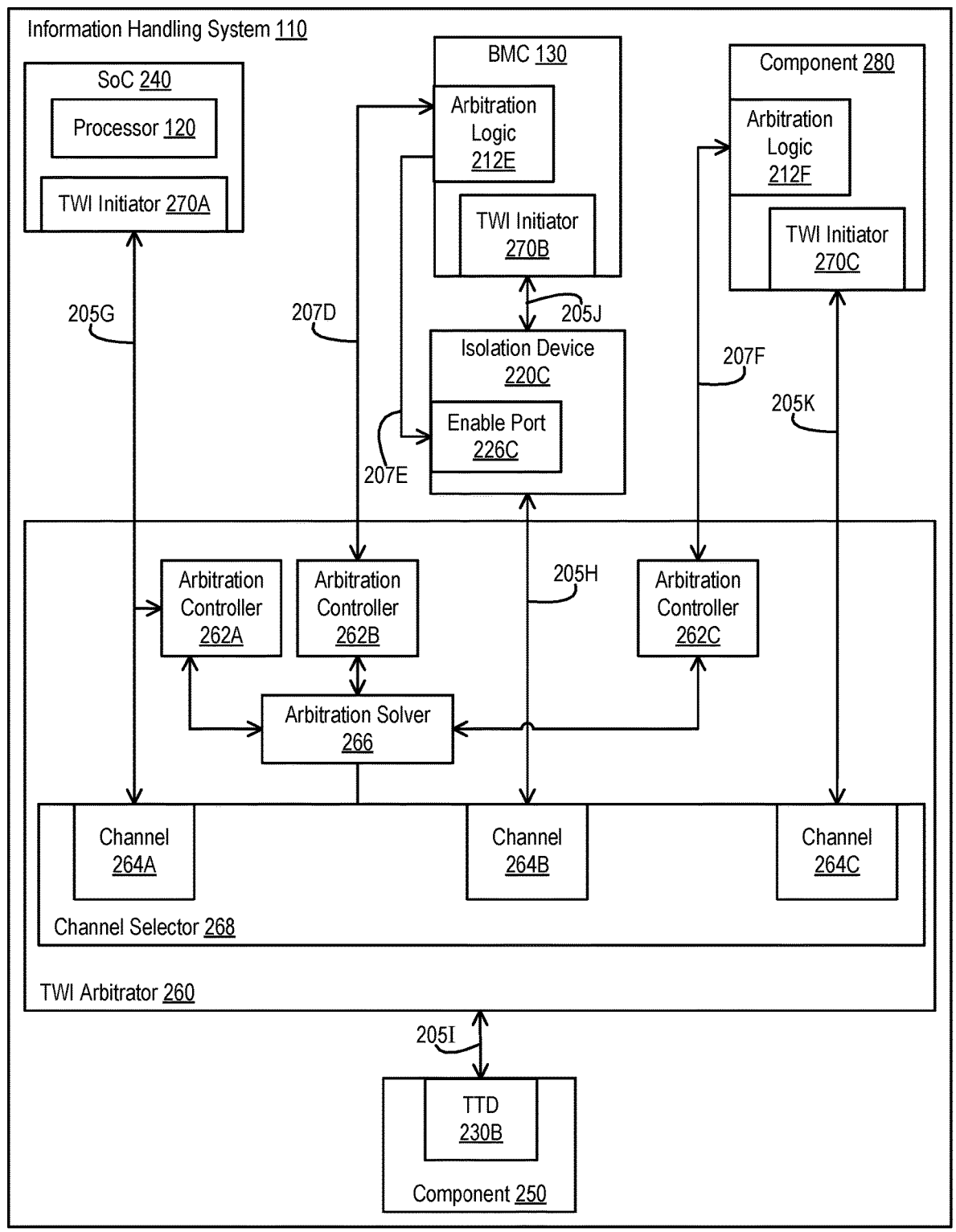
FIG. 2E illustrates an example of a two-wire interface arbitrator that includes a channel selector, according to one or more embodiments.

Turning now to FIG. 2E, an example of a two-wire interface arbitrator that includes a channel selector is illustrated, according to one or more embodiments. In one or more embodiments, SoC 240 may include a TWI initiator 270A. For example, TWI initiator 270A may be coupled to TWI bus 205G. In one or more embodiments, BMC 130 may include an arbitration logic 212E and a TWI initiator 270B. In one example, TWI initiator 270B may be coupled to TWI bus 205H. In another example, arbitration logic 212E may be coupled to an out of band signal path 207D. For instance, out of band signal path 207D may be external to a TWI bus 205J.

In one or more embodiments, an isolation device 220C may be coupled to TWI bus 205J. For example, isolation device 220C may include an enable port 226C. For instance, enable port 226C may be coupled to arbitration logic 212E. As an example, enable port 226C may be coupled to arbitration logic 212E via an out of band signal path 207E. In one or more embodiments, isolation device 220C may receive data from BMC 130 via TWI bus 205J. For example, isolation device 220C provide the data received from BMC 130 to TWI arbitrator 260. For instance, isolation device 220C provide the data received from BMC 130 to TWI arbitrator 260 via TWI bus 205H.

In one or more embodiments, a component 280 may include an arbitration logic 212F and a TWI initiator 270C. In one example, TWI initiator 270C may be coupled to TWI bus 205K. In another example, arbitration logic 212YA may be coupled to an out of band signal path 207F. For instance, out of band signal path 207F may be external to TWI bus 205K. In one or more embodiments, component 250 may include TTD 230B. For example, TTD 230B may be coupled to TWI bus 205I. For instance, TWI arbitrator 260 may be coupled to TWI bus 260.

Although FIG. 2E illustrates TWI arbitrator 260 coupled to TWI buses 205G-205I and 205K, TWI arbitrator 260 may be coupled to any number of TWI buses, according to one or more embodiments. In one or more embodiments, TWI arbitrator 260 may include multiple channels, which may be coupled to multiple respective TWI buses. For example, TWI arbitrator 260 may include channels 264A-264C, which may be coupled to respective TWI buses 205G, 205H, and 205K. In one instance, TWI arbitrator 260 may receive data via one or more of channels 264A-264C. As an example, TWI arbitrator 260 may provide the data to component 250. In another instance, TWI arbitrator 260 may provide data via one or more of channels 264A-264C. As an example, TWI arbitrator 260 may have received the data from component 250.

In one or more embodiments, TWI arbitrator 260 may include multiple arbitration controllers. As illustrated, TWI arbitrator 260 may include multiple arbitration controllers 262A-262C. In one example, an arbitration controllers 262 may be coupled to a TWI bus 205. For instance, arbitration controller 262A may be coupled to TWI bus 205G. In another example, an arbitration controller 262 may be coupled to an out of band signal path 207. In one instance, arbitration controller 262B may be coupled to out of band signal path 207D. In another instance, arbitration controller 262C may be coupled to out of band signal path 207F.

In one or more embodiments, TWI arbitrator 260 may include an arbitration solver. For example, the multiple arbitration controllers of TWI arbitrator 260 may be coupled to the arbitration solver. For instance, arbitration controllers 262A-262C may be coupled to an arbitration solver 266. In one or more embodiments, arbitration solver 266 may include implemented logic and/or circuitry that may determine which of SoC 240, BMC 130, and component 280 can be a TWI initiator device.

In one example, arbitration solver 266 may determine that SoC 240 can be the TWI initiator device for TWI bus 205I. In one instance, arbitration solver 266 may permit SoC 240 to transfer data to component 250 as the TWI initiator device. In another instance, when arbitration solver 266 permits SoC 240 to transfer data to component 250 as the TWI initiator device, arbitration solver 266 may stall or interrupt BMC 130 and component 280 from being able to communicate with TWI bus 205I. In a second example, arbitration solver 266 may determine that BMC 130 can be the TWI initiator device for TWI bus 205I. In one instance, arbitration solver 266 may permit BMC 130 to transfer data to component 250 as the TWI initiator device. In another instance, when arbitration solver 266 permits BMC 130 to transfer data to component 250 as the TWI initiator device, arbitration solver 266 may stall or interrupt SoC 240 and component 280 from being able to communicate with TWI bus 205I. In another example, arbitration solver 266 may determine that component 280 can be the TWI initiator device for TWI bus 205I. In one instance, arbitration solver 266 may permit component 280 to transfer data to component 250 as the TWI initiator device. In another instance, when arbitration solver 266 permits component 280 to transfer data to component 250 as the TWI initiator device, arbitration solver 266 may stall or interrupt SoC 240 and BMC 130 from being able to communicate with TWI bus 205I.

In one or more embodiments, arbitration solver 266 may control SoC 240, BMC 130, and component 280 via arbitration controllers 262A-262C, respectively. In one example, arbitration solver 266 may provide one or more control information to one or more of SoC 240, BMC 130, and component 280 via arbitration controllers 262A-262C, respectively. In another example, one or more of controllers 262A-262C may respectively provide control information to one or more of SoC 240, BMC 130, and component 280. As an example, one or more of first control information, second control information, and third control information may be respectively provided to one or more of SoC 240, BMC 130, and component 280. In one instance, one of the first control information, the second control information, and the third control information may be different from another of the first control information, the second control information, and the third control information. In another instance, one of the first control information, the second control information, and the third control information may be the same as another of the first control information, the second control information, and the third control information.

In one or more embodiments, arbitration controller 262A may implement an in-band arbitration process. For example, arbitration controller 262A may implement the in-band arbitration process with one or more devices coupled to TWI bus 205G. In one or more embodiments, arbitration controller 262A may include a mock multi-initiator device or a mock multi-master device, among others. For example, arbitration controller 262A may include a pseudo I2C initiator. For instance, the pseudo I2C initiator may implement the in-band arbitration process with one or more devices coupled to TWI bus 205G. In one or more embodiments, arbitration controller 262A may instruct SoC 240 to cease providing data via TWI bus 205G. For example, arbitration controller 262A may utilize a multi-master protocol to instruct SoC 240 to cease providing data via TWI bus 205G. For instance, SoC 240 may utilize the multi-master protocol. In one or more embodiments, arbitration controller 262A may instruct SoC 240 to pause providing data via TWI bus 205G.

In one or more embodiments, arbitration solver 266 may determine which TWI initiator can communicate with TTD 230B. For example, arbitration solver 266 may include circuitry that can select a channel 264 of channels 264A-264C, which can communicate with TTD 230B. Although channels 264A-264C are illustrated, TWI arbitrator 260 may include any number of channels 264, according to one or more embodiments. For example, arbitration solver 266 may include circuitry that can select a channel 264 of any number of channels 264, which can communicate with TTD 230B.

In one or more embodiments, channel selector 268 may multiplex channels 264A-264C, which may enable channel selector 268 to select an individual channel 264 of channels 264A-264C that can communicate with TTD 230B. For example, TWI arbitrator 260 may establish a communication coupling between a TWI bus 205 of TWI buses 205G, 205H, and 05K and TWI bus 205I utilizing channel selector 268. In one instance, TWI arbitrator 260 may receive first data via a channel 264, of channels 264A-264C, associated with the TWI bus 205 of TWI buses 205G, 205H, and 05K, and channel selector 268 may provide the first data TWI bus 205I. In another instance, TWI arbitrator 260 may receive second data via TWI bus 205I, and channel selector 268 may provide the second data to the TWI bus 205 of TWI buses 205G, 205H, and 05K associated with the channel 264, of channels 264A-264C.

Figure 2F:
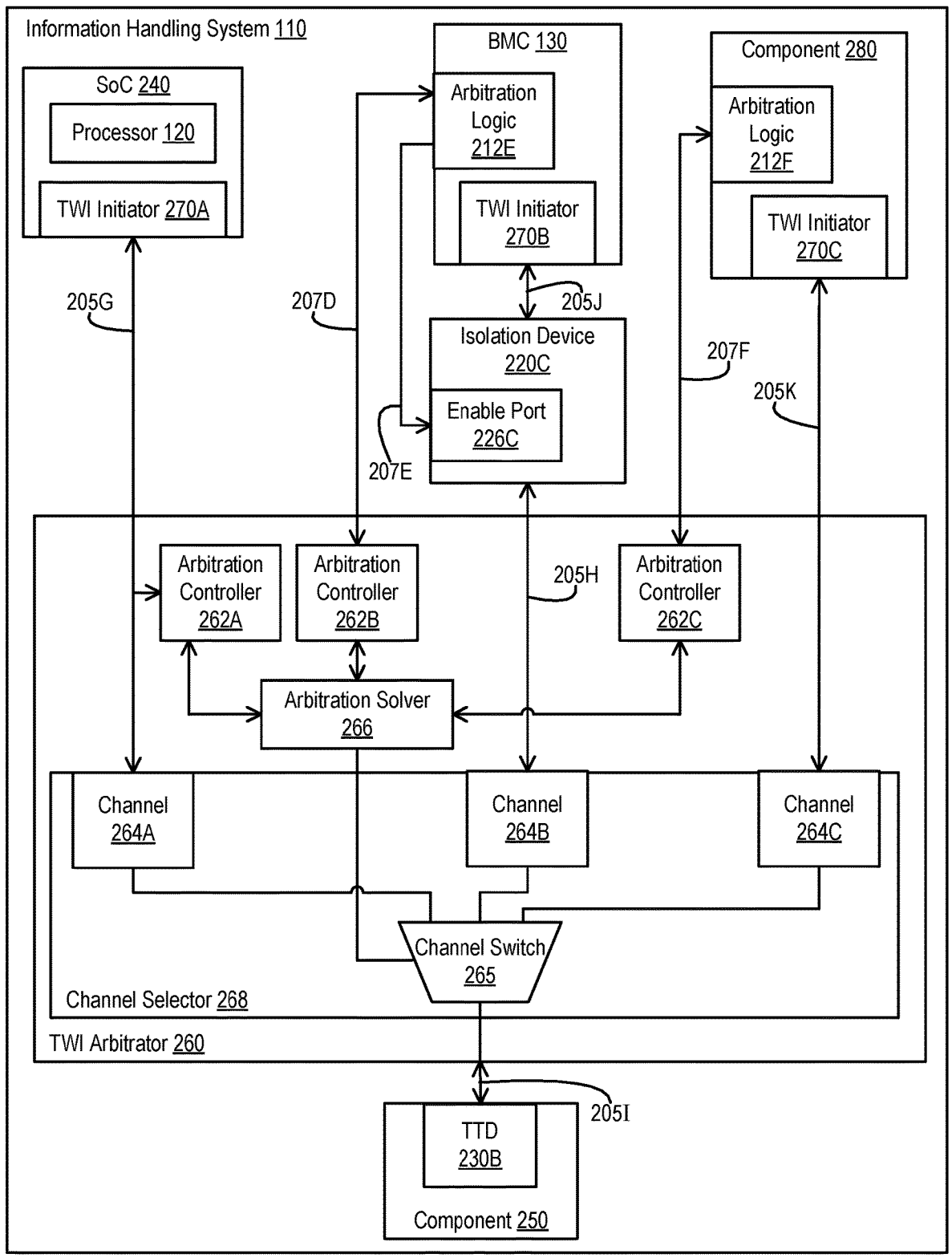
FIG. 2F illustrates a second example of a two-wire interface arbitrator that includes a channel selector, according to one or more embodiments.

Turning now to FIG. 2F, a second example of a two-wire interface arbitrator that includes a channel selector is illustrated, according to one or more embodiments. In one or more embodiments, channel selector 268 may include a channel switch 265, which may multiplex channels 264A-264C based at least on input from arbitration solver 266. For example, the input from arbitration solver 266 may indicate an individual channel 264 of channels 264A-264C that can communicate with TWI bus 205I. For instance, the input from arbitration solver 266 may indicate an individual channel 264 of channels 264A-264C that can communicate with TTD 230B of component 250. In one or more embodiments, channel selector 268 may include crossbar technology (CBT) that may enable channel selector 268 to multiplex channels 264A-264C. For example, channel switch 265 may include CBT that may enable channel switch 265 to multiplex channels 264A-264C based at least on input from arbitration solver 266.

Figure 2G:
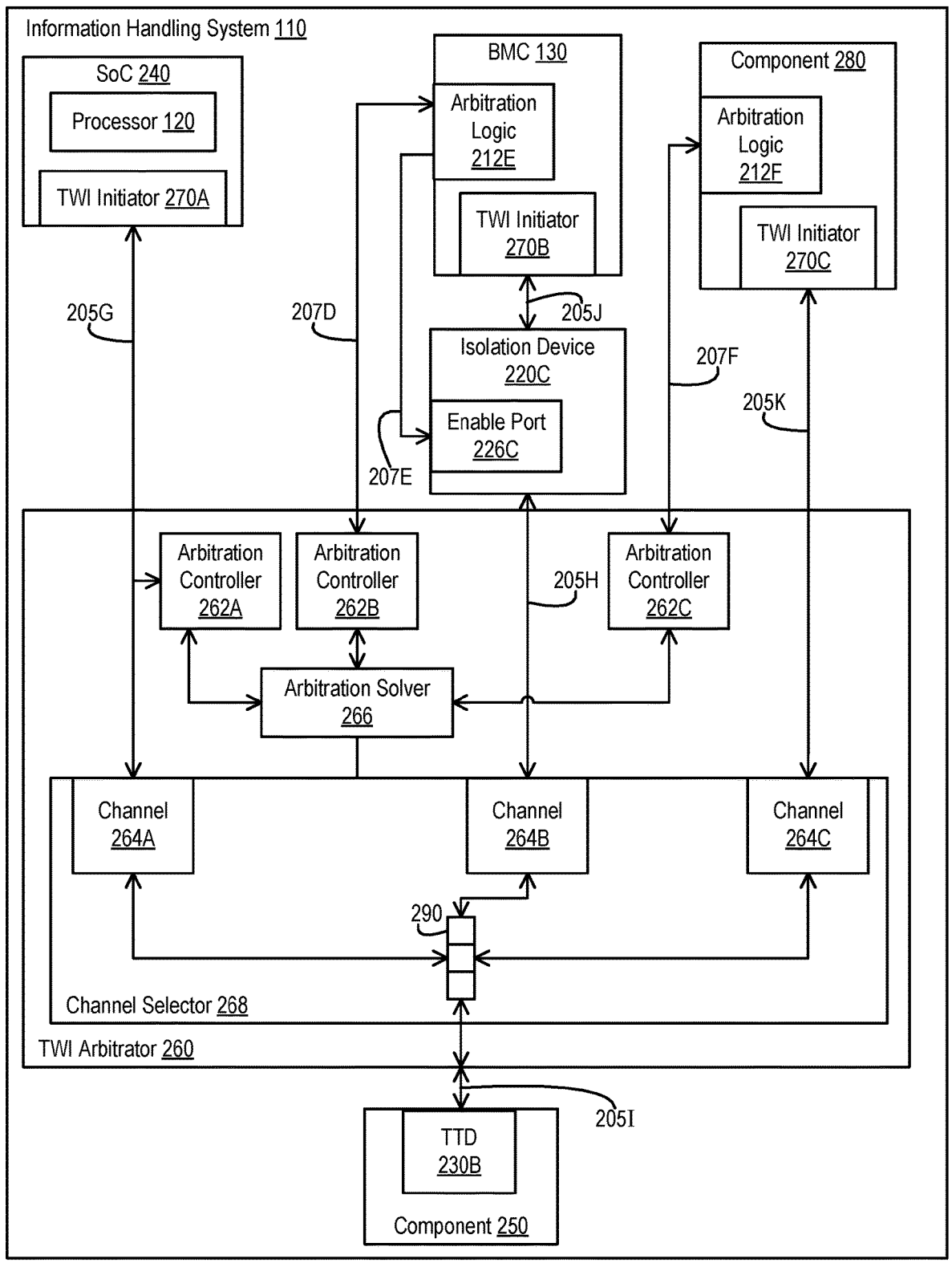
FIG. 2G illustrates a third example of a two-wire interface arbitrator that includes a buffer, according to one or more embodiments.

Turning now to FIG. 2G, a third example of a two-wire interface arbitrator that includes a buffer is illustrated, according to one or more embodiments. In one or more embodiments, channel selector 268 may include a buffer that may enable channel selector 268 to multiplex channels 264A-264C. For example, channel selector 268 may include a buffer 290. In one instance, buffer 290 may store data received from channels 264A-264C and may provide the data to TTD 230B. As an example, buffer 290 may store data received from channels 264A-264C and may provide the data to TTD 230B based at least on input from arbitration solver 266. In another instance, buffer 290 may store data received from TTD 230B and may provide the data to channels 264A-264C. As an example, buffer 290 may store data received from TTD 230B and may provide the data to channels 264A-264C based at least on input from arbitration solver 266. In one or more embodiments, buffer 290 may implement a first in first out data structure. For example, buffer 290 may implement a queue.

Figure 2H:
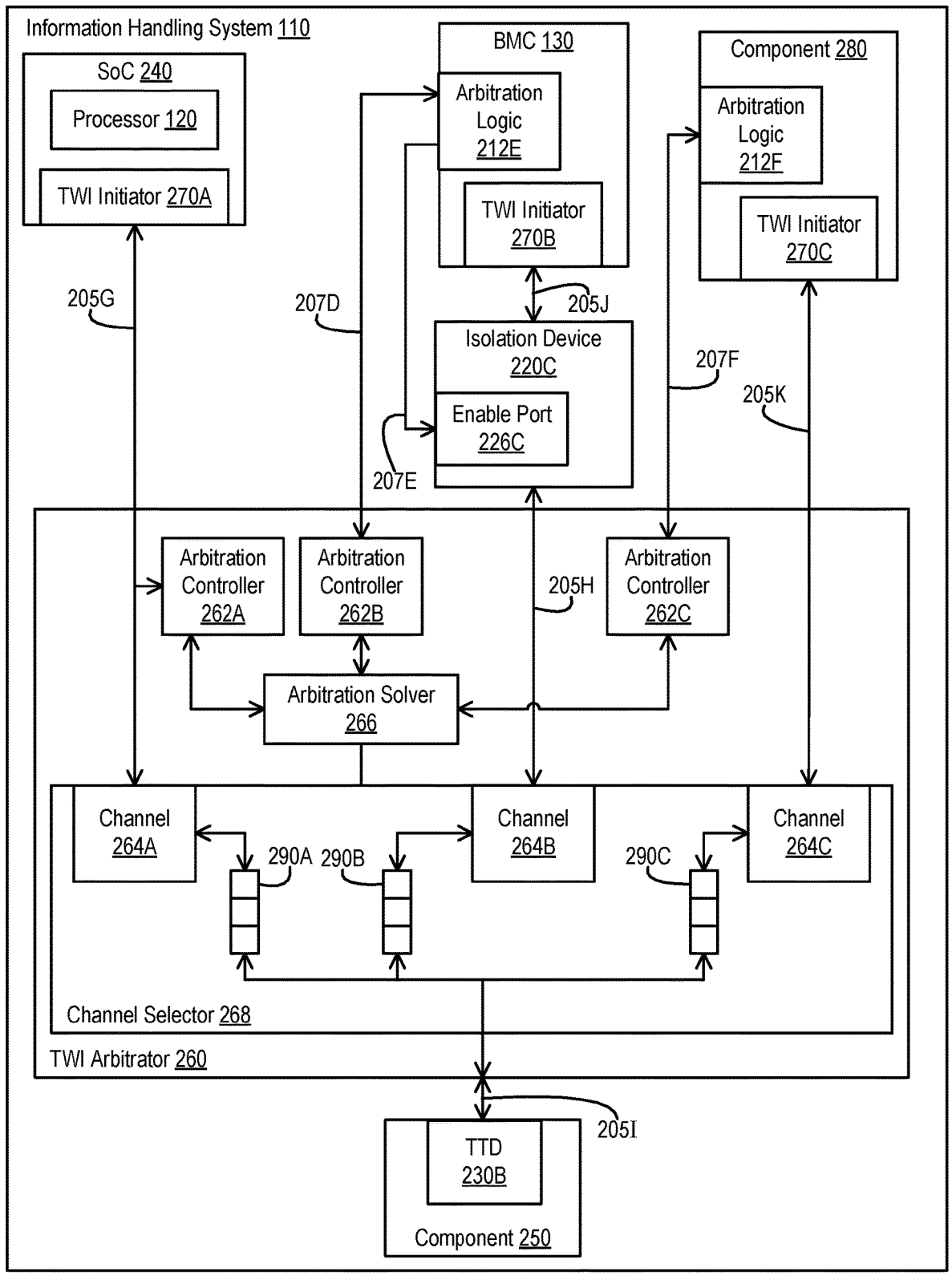
FIG. 2H illustrates a fourth example of a two-wire interface arbitrator that includes multiple buffers, according to one or more embodiments.

Turning now to FIG. 2H, a fourth example of a two-wire interface arbitrator that includes multiple buffers is illustrated, according to one or more embodiments. In one or more embodiments, channel selector 268 may include multiple buffers that may enable channel selector 268 to multiplex channels 264A-264C. For example, channel selector 268 may include a buffer for each channel 264. For instance, channel selector 268 may include buffers 290A-290C, which may be respectively associated with channels 264A-264C. As an example, a buffer 290 may store data received from a respective channel 264 and may provide the data to TTD 230B. As another example, a buffer 290 may store data received from TTD 230B and may provide the data to a respective channel 264. In one or more embodiments, a buffer 290 may implement a first in first out data structure. For example, a buffer 290 may implement a queue.

Figure 2I:
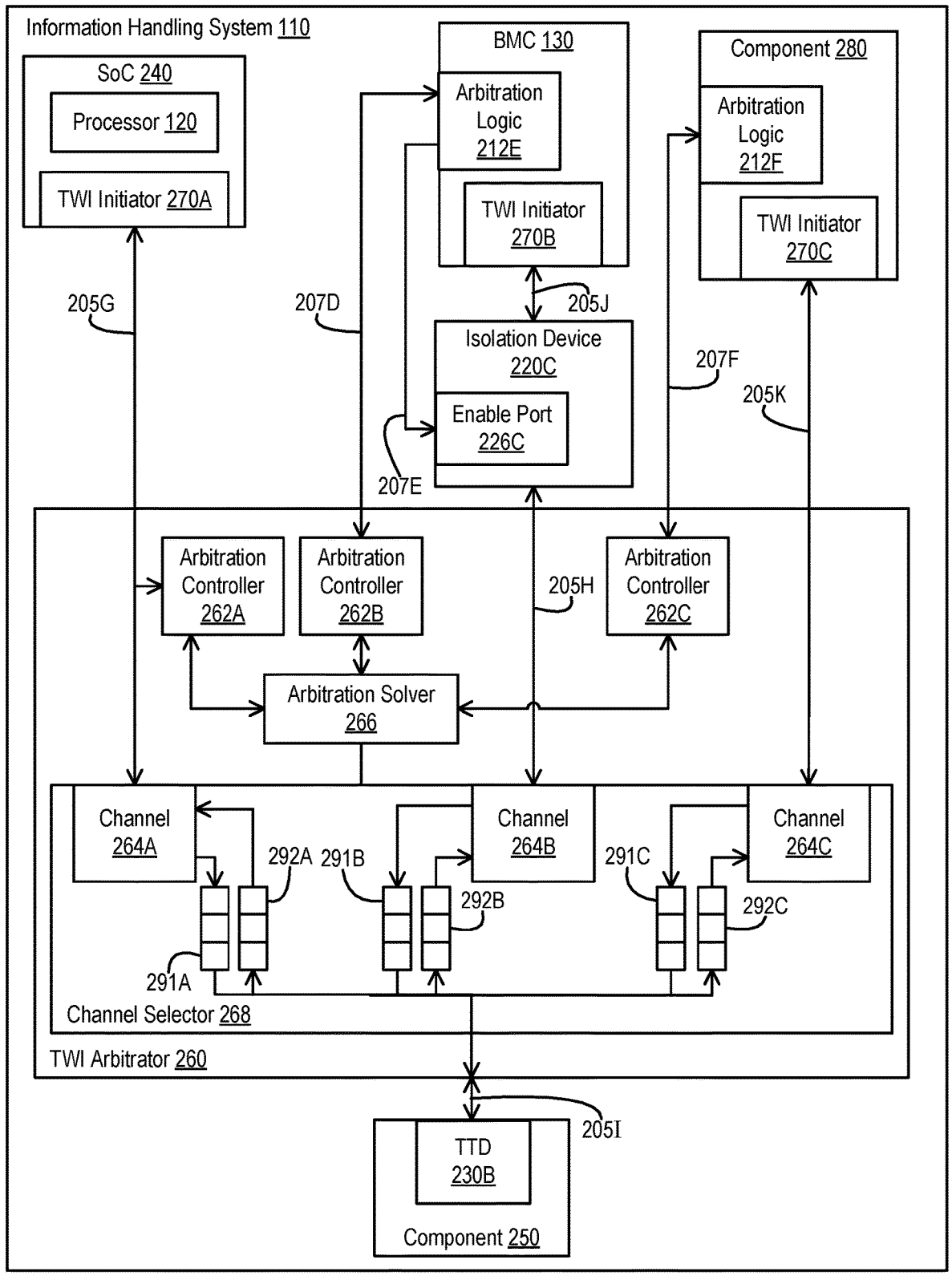
FIG. 2I illustrates another example of a two-wire interface arbitrator that includes multiple buffers, according to one or more embodiments.

Turning now to FIG. 2I, another example of a two-wire interface arbitrator that includes multiple buffers is illustrated, according to one or more embodiments. In one or more embodiments, channel selector 268 may include multiple buffers for each channel 264. For example, channel selector 268 may include a TID buffer 291 and a TTD buffer 292 for each channel 264. In one instance, channel selector 268 may include a TID buffer 291A and a TTD buffer 292A associated with channel 264A. In a second instance, channel selector 268 may include a TID buffer 291B and a TTD buffer 292B associated with channel 264B. In another instance, channel selector 268 may include a TID buffer 291C and a TTD buffer 292C associated with channel 264C. In one or more embodiments, TID buffer 291 may receive data from channel 264 and may provide the data to TTD 230B. For example, TID buffer 291 may store the data from channel 264 and may provide the data to TTD 230B. In one or more embodiments, TTD buffer 292 may receive data from TTD 230B and may provide the data to channel 264. For example, TTD buffer 292 may store the data from TTD 230B and may provide the data to channel 264. In one or more embodiments, a buffer 291 may implement a first in first out data structure. For example, buffer 291 may implement a queue. In one or more embodiments, a buffer 292 may implement a first in first out data structure. For example, buffer 292 may implement a queue.

Figure 3:
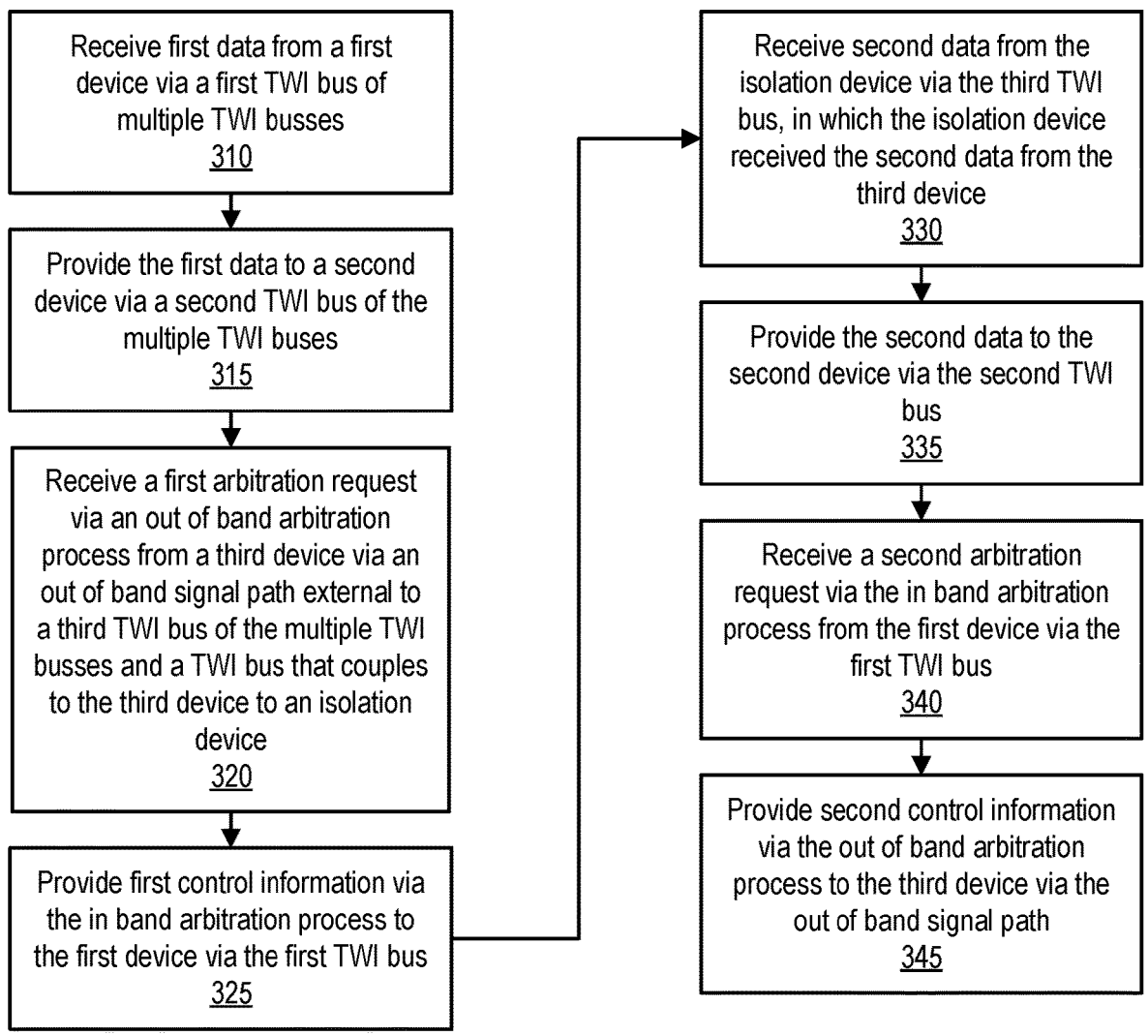
FIG. 3 illustrates an example of a method of operating a two-wire interface arbitrator, according to one or more embodiments

Turning now to FIG. 3, an example of a method of operating a two-wire interface arbitrator is illustrated, according to one or more embodiments. At 310, first data may be received from a first device via a first TWI bus of multiple TWI buses. For example, the first device may include SoC 240. For instance, TWI arbitrator 260 may receive first data from SoC 240 via TWI bus of multiple TWI buses of IHS 110. At 315, the first data may be provided to a second device via a second TWI bus of the multiple TWI buses. For example, the second device may include component 250. For instance, TWI arbitrator 260 may provide the first data to component 250 of IHS 110 via a second TWI bus of the multiple TWI buses. In one or more embodiments, a component of IHS 110 may include BMC 130, volatile memory medium 150, non-volatile memory media 160 and 170, I/O subsystem 175, network interface 180, or a connector, among others.

At 320, a first arbitration request may be received via an out of band arbitration process from a third device via an out of band signal path external to a third TWI bus of the multiple TWI buses and a TWI bus that couples to the third device to an isolation device. For example, the third device may include a baseboard management controller. For instance, TWI arbitrator 260 may receive a first arbitration request via an out of band arbitration process from BMC 130 via an out of band signal path external to a third TWI bus of the multiple TWI buses and a TWI bus that couples to BMC 130 to isolation device 220.

In one or more embodiments, the first arbitration request may include a request to become an initiator device associated with the second device (e.g., a target device). For example, since BMC 130 may not be able to utilize an in band arbitration process, BMC 130 may provide the first arbitration request to TWI arbitrator 260 via the out of band signal path. For instance, TWI arbitrator 260 may utilize the in band arbitration process to interrupt or stall the first device (e.g., SoC 240). As an example, TWI arbitrator 260 may utilize the in band arbitration process to interrupt or stall the first device (e.g., SoC 240) on behalf of BMC 130. In one or more embodiments, isolation device 220 (e.g., a bus switch) may prevent BMC 130 from utilizing the in band arbitration process.

At 325, first control information may be provided via the in band arbitration process to the first device via the first TWI bus. For example, TWI arbitrator 260 may provide first control information via the in band arbitration process to SoC 240 via the first TWI bus. In one or more embodiments, providing first control information via the in band arbitration process to the first device via the first TWI bus may be performed in response to receiving the first arbitration request. At 330, second data may be received from the isolation device via the third TWI bus, in which the isolation device received the second data from the third device. For example, TWI arbitrator 260 may receive second data from isolation device 220 via the third TWI bus, in which isolation device 220 received the second data from BMC 130. In one or more embodiments, receiving second data from the isolation device via the third TWI bus may be performed after providing the first control information.

At 335, the second data may be provided to the second device via the second TWI bus. For example, TWI arbitrator 260 may provide the second data to component 250 via the second TWI bus. At 340, a second arbitration may be received request via the in band arbitration process from the first device via the first TWI bus. For example, TWI arbitrator 260 may receive a second arbitration request via the in band arbitration process from SoC 240 via the first TWI bus. In one or more embodiments, the second arbitration request may include a request to become an initiator device associated with the second device (e.g., the target device). For example, since BMC 130 may not be able to utilize an in band arbitration scheme, SoC 240 may provide the second arbitration request to TWI arbitrator 260. For instance, TWI arbitrator 260 may utilize the out of band arbitration scheme to interrupt or stall the third device (e.g., BMC 130). As an example, TWI arbitrator 260 may utilize the out of band arbitration scheme to interrupt or stall the third device (e.g., BMC 130) on behalf of SoC 240. In one or more embodiments, isolation device 220 (e.g., a bus switch) may prevent BMC 130 from utilizing the in band arbitration scheme.

At 345, second control information may be provided via the out of band arbitration process to the third device via the out of band signal path. For example, TWI arbitrator 260 may provide second control information via the out of band arbitration process to BMC 130 via the out of band signal path. In one or more embodiments, providing the second control information via the out of band arbitration process to the third device via the out of band signal path may be performed in response to receiving the second arbitration request.

In one or more embodiments, the TWI arbitrator may include multiple arbitration controllers. In one example, providing the first control information via the in band arbitration process to the first device via the first TWI bus may include a first arbitration controller of the multiple arbitration controllers providing the first control information via the in band arbitration process to the first device via the first TWI bus. In another example, providing the second control information via the out of band arbitration process to the third device via the out of band signal path may include a second arbitration controller of the multiple arbitration controllers providing the second control information via the out of band arbitration process to the third device via the out of band signal path.

In one or more embodiments, the first TWI bus may include an $I^2C$ bus. For example, the first arbitration controller may include a pseudo $I^2C$ initiator configured to utilize an $I^2C$ bus arbitration process. For instance, providing the first control information via the in band arbitration process to the first device via the first TWI bus may include the pseudo $I^2C$ initiator providing the first control information via the in band arbitration process to the first device via the $I^2C$ bus. In one or more embodiments, the TWI arbitrator may include a channel switch. For example, after providing the first control information to the first device, the TWI arbitrator may configure the channel switch from a first channel associated with the first TWI bus to a second channel associated with the third TWI bus to receive the second data from the isolation device via the third TWI bus.

In one or more embodiments, the TWI arbitrator may include a buffer. For example, after receiving the first data from the first device, the TWI arbitrator may store at least a portion of the first data in the buffer. For instance, providing the first data to the second device may include retrieving the at least the portion of the first data from the buffer. In one or more embodiments, retrieving the at least the portion of the first data from the buffer and providing the first control information to the first device may be performed concurrently. For example, the TWI arbitrator may be configured to concurrently perform: retrieving the at least the portion of the first data from the buffer and providing the first control information to the first device.

Although the examples described herein utilize a TWI, any serial interface may be utilized, according to one or more embodiments. For example, a serial interface may include a SPI interface, a controller area network (CAN) interface, a universal asynchronous receiver-transmitter (UART) interface, a RS-232 interface, a RS-422 interface, a RS-423 interface, or a RS-485 interface, among others. For instance, one or more systems, one or more methods, and/or one or more processes described herein may be utilized with one or more of a controller area network protocol, a universal asynchronous receiver-transmitter protocol, a RS-232 protocol, a RS-422 protocol, a RS-423 protocol, and a RS-485 protocol, among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a plurality of two-wire interface (TWI) buses;
a TWI arbitrator coupled to the plurality of TWI buses;
a system on chip (SoC) coupled to the TWI arbitrator via a first TWI bus of the plurality of TWI buses;
a component coupled to the TWI arbitrator via a second TWI bus of the plurality of TWI buses;
an isolation device coupled to the TWI arbitrator via a third TWI bus of the plurality of TWI buses; and
a baseboard management controller coupled to the isolation device via a TWI bus, different from the plurality of TWI buses;
wherein the SoC includes at least one processor configured to execute instructions from a memory medium;
wherein the SoC is configured to utilize an in band arbitration process;
wherein the baseboard management controller is configured to utilize an out of band arbitration process via an out of band signal path external to the third TWI bus and external to the TWI bus that couples the baseboard management controller to the isolation device; and
wherein the TWI arbitrator is configured to:
receive first data from the SoC via the first TWI bus;
provide the first data to the component via the second TWI bus;
receive a first arbitration request via the out of band arbitration process from the baseboard management controller via the out of band signal path external to the third TWI bus and the TWI bus coupled to the baseboard management controller;
in response to receiving the first arbitration request, provide first control information via the in band arbitration process to the SoC via the first TWI bus;
after providing the first control information, receive second data from the isolation device via the third TWI bus, wherein the isolation device received the second data from the baseboard management controller;
provide the second data to the component via the second TWI bus;
receive a second arbitration request via the in band arbitration process from the SoC via the first TWI bus; and
in response to receiving the second arbitration request, provide second control information via the out of band arbitration process to the baseboard management controller via the out of band signal path external to the TWI bus that couples the baseboard management controller to the isolation device.

2. The information handling system of claim 1, wherein the TWI arbitrator is indirectly coupled to the baseboard management controller via the isolation device.

3. The information handling system of claim 1,
wherein the TWI arbitrator includes a plurality of arbitration controllers;
wherein, to provide the first control information via the in band arbitration process to the SoC via the first TWI bus, a first arbitration controller of the plurality of arbitration controllers is configured to provide the first control information via the in band arbitration process to the SoC via the first TWI bus; and
wherein, to provide the second control information via the out of band arbitration process to the baseboard management controller via the out of band signal path, a second arbitration controller of the plurality of arbitration controllers is configured to provide the second control information via the out of band arbitration process to the baseboard management controller via the out of band signal path.

4. The information handling system of claim 3,
wherein the first TWI bus includes an inter-integrated circuit ($I^2C$) bus;
wherein the first arbitration controller includes a pseudo $I^2C$ initiator configured to utilize an $I^2C$ bus arbitration process; and
wherein, to provide the first control information via the in band arbitration process to the SoC via the first TWI bus, the pseudo $I^2C$ initiator is configured to provide the first control information via the in band arbitration process to the SoC via the $I^2C$ bus.

5. The information handling system of claim 1,
wherein the TWI arbitrator includes a channel switch;
wherein the TWI arbitrator is further configured to, after providing the first control information to the SoC, configure the channel switch from a first channel associated with the first TWI bus to a second channel associated with the third TWI bus to receive the second data from the isolation device via the third TWI bus.

6. The information handling system of claim 1,
wherein the TWI arbitrator includes a buffer;
wherein the TWI arbitrator is further configured to, after receiving the first data from the SoC, store at least a portion of the first data in the buffer; and
wherein, to provide the first data to the component, the TWI arbitrator is further configured to retrieve the at least the portion of the first data from the buffer.

7. The information handling system of claim 6, wherein the TWI arbitrator is further configured to concurrently perform: retrieving the at least the portion of the first data from the buffer and providing the first control information to the SoC.

8. A method, comprising:
receiving, by a two-wire interface (TWI) arbitrator coupled to a plurality of TWI buses, first data from a first device via a first TWI bus of the plurality of TWI buses;
providing, by the TWI arbitrator, the first data to a second device via a second TWI bus of the plurality of TWI buses;
receiving, by the TWI arbitrator, a first arbitration request via an out of band arbitration process from a third device via an out of band signal path external to a third TWI bus of the plurality of TWI buses and a TWI bus, different from the plurality of TWI buses, that couples to the third device to an isolation device;
in response to the receiving the first arbitration request, providing, by the TWI arbitrator, first control information via an in band arbitration process to the first device via the first TWI bus;
receiving, by the TWI arbitrator, second data from the isolation device via the third TWI bus, wherein the isolation device received the second data from the third device;
providing, by the TWI arbitrator, the second data to the second device via the second TWI bus;
receiving, by the TWI arbitrator, a second arbitration request via the in band arbitration process from the first device via the first TWI bus; and
in response to the receiving the second arbitration request, providing, by the TWI arbitrator, second control information via the out of band arbitration process to the third device via the out of band signal path external to the third TWI bus and the TWI bus that couples to the third device to the isolation device.

9. The method of claim 8, wherein the TWI arbitrator is indirectly coupled to a baseboard management controller via the isolation device.

10. The method of claim 8,
wherein the TWI arbitrator includes a plurality of arbitration controllers;
wherein the providing the first control information via the in band arbitration process to the first device includes providing, by a first arbitration controller of the plurality of arbitration controllers, the first control information via the in band arbitration process to the first device via the first TWI bus; and
wherein the providing the second control information via the out of band arbitration process to the third device via the out of band signal path includes providing, by a second arbitration controller of the plurality of arbitration controllers, the second control information via the out of band arbitration process to the third device via the out of band signal path.

11. The method of claim 10,
wherein the first TWI bus includes an inter-integrated circuit ($I^2C$) bus;
wherein the first arbitration controller includes a pseudo $I^2C$ initiator configured to utilize an $I^2C$ bus arbitration process; and
wherein the providing, by the first arbitration controller, the first control information via the in band arbitration process to the first device via the first TWI bus includes providing, by the pseudo $I^2C$ initiator, the first control information via the in band arbitration process to the first device via the $I^2C$ bus.

12. The method of claim 8, wherein the TWI arbitrator includes a channel switch;
the method further comprising:
after the providing the first control information, configuring the channel switch from a first channel associated with the first TWI bus to a second channel associated with the third TWI bus to receive the third data from the isolation device via the third TWI bus.

13. The method of claim 8, further comprising:
after the receiving the first data from the first device, storing at least a portion of the first data in a buffer of the TWI arbitrator;
wherein the providing the first data to the second device includes retrieving the at least the portion of the first data from the buffer.

14. The method of claim 13, wherein the retrieving the at least the portion of the first data from the buffer and the providing the first control information to the first device are performed concurrently.

15. A two-wire interface (TWI) arbitrator, configured to:
receive first data from a first device of an information handling system via a first TWI bus of a plurality of TWI buses of the information handling system;
provide the first data to a second device via a second TWI bus of the plurality of TWI buses;
receive a first arbitration request via an out of band arbitration process from a third device of the information handling system via an out of band signal path external to a third TWI bus of the plurality of TWI buses and a TWI bus, different from the plurality of TWI buses, that couples to the third device to an isolation device of the information handling system;
in response to receiving the first arbitration request, provide first control information via an in band arbitration process to the first device via the first TWI bus;
receive second data from the isolation device via the third TWI bus, wherein the isolation device received the second data from the third device;
provide the second data to the second device via the second TWI bus;
receive a second arbitration request via the in band arbitration process from the first device via the first TWI bus; and
in response to receiving the second arbitration request, provide second control information via the out of band arbitration process to the third device via the out of band signal path external to the third TWI bus and the TWI bus that couples to the third device to the isolation device.

16. The TWI arbitrator of claim 15,
wherein the TWI arbitrator includes a plurality of arbitration controllers;
wherein, to provide the first control information via the in band arbitration process to the first device via the first TWI bus, a first arbitration controller of the plurality of arbitration controllers is configured to provide the first control information via the in band arbitration process to the first device via the first TWI bus; and
wherein, to provide the second control information via the out of band arbitration process to the third device via the out of band signal path, a second arbitration controller of the plurality of arbitration controllers is configured to provide the second control information via the out of band arbitration process to the third device via the out of band signal path.

17. The TWI arbitrator of claim 16,
wherein the first TWI bus includes an inter-integrated circuit ($I^2C$) bus;
wherein the first arbitration controller includes a pseudo $I^2C$ initiator configured to utilize an $I^2C$ bus arbitration process; and
wherein, to provide the first control information via the in band arbitration process to the first device via the first TWI bus, the pseudo $I^2C$ initiator is configured to provide the first control information via the in band arbitration process to the first device via the $I^2C$ bus.

18. The TWI arbitrator of claim 15,
wherein the TWI arbitrator includes a channel switch;
wherein the TWI arbitrator is further configured to, after providing the first control information to the first device, configure the channel switch from a first channel associated with the first TWI bus to a second channel associated with the third TWI bus to receive the second data from the isolation device via the third TWI bus.

19. The TWI arbitrator of claim 15,
wherein the TWI arbitrator includes a buffer;
wherein the TWI arbitrator is further configured to, after receiving the first data from the first device, store at least a portion of the first data in the buffer; and
wherein, to provide the first data to the second device, the TWI arbitrator is further configured to retrieve the at least the portion of the first data from the buffer.

20. The TWI arbitrator of claim 19, wherein the TWI arbitrator is further configured to concurrently perform: retrieving the at least the portion of the first data from the buffer and providing the first control information to the first device.

* * * * *